United States Patent
Alasti et al.

(10) Patent No.: US 11,671,923 B2
(45) Date of Patent: *Jun. 6, 2023

(54) NTN UPLINK POWER CONTROL

(71) Applicant: DISH WIRELESS L.L.C., Englewood, CO (US)

(72) Inventors: Mehdi Alasti, Reston, VA (US); Siddhartha Chenumolu, Broadlands, VA (US); Mariam Sorond, Reston, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,344

(22) Filed: Feb. 8, 2022

(65) Prior Publication Data

US 2022/0330168 A1 Oct. 13, 2022

Related U.S. Application Data

(63) Continuation of application No. 16/689,911, filed on Nov. 20, 2019, now Pat. No. 11,277,802.

(Continued)

(51) Int. Cl.
*H04W 52/20* (2009.01)
*H04W 52/14* (2009.01)
(Continued)

(52) U.S. Cl.
CPC ........ *H04W 52/20* (2013.01); *H04B 7/18519* (2013.01); *H04B 7/18543* (2013.01);
(Continued)

(58) Field of Classification Search
CPC . H04W 52/20; H04W 52/146; H04W 52/228; H04W 52/245; H04B 7/18519; H04B 7/18543; H04L 5/0048
See application file for complete search history.

(56) References Cited

U.S. PATENT DOCUMENTS

| 11,277,802 | B2* | 3/2022 | Alasti | H04W 52/325 |
| 2010/0285830 | A1* | 11/2010 | Englund | H04W 52/30 |
| | | | | 455/522 |
| 2017/0289921 | A1* | 10/2017 | Kim | H04W 72/0473 |

OTHER PUBLICATIONS

Nokia et al., "Considerations on UL Power Control, AMC and CSI in NTN", 3GPP TSG RAN WG1 Meeting #98, R1-1908251, Prague, Czech Republic, Aug. 26-30, 2019 (6pp.) (Year: 2019).*

(Continued)

*Primary Examiner* — Ankur Jain
*Assistant Examiner* — Angelica M Perez
(74) *Attorney, Agent, or Firm* — Seed IP Law Group, LLP

(57) ABSTRACT

Systems and methods for controlling uplink power in a non-terrestrial network (NTN). An NTN station transmits a reference signal at a first time having a defined transmission power and the reference signal is received by non-terrestrial user equipment. The user equipment evaluates the reference signal and determines a first downlink loss of the reference signal by calculating a difference between a measured power level of the received reference signal and the defined transmission power. The NTN station transmits a communication signal at a second time and is received by the user equipment, which estimates a second downlink loss of the communication signal based on the first downlink loss and a power level of the communication signal. A first uplink loss is estimated based on the second downlink loss, and the user equipment adjusts a transmission power of its transmitter based on the first uplink loss.

20 Claims, 6 Drawing Sheets

Related U.S. Application Data

(60) Provisional application No. 62/890,406, filed on Aug. 22, 2019.

(51) Int. Cl.
*H04W 52/22* (2009.01)
*H04B 7/185* (2006.01)
*H04L 5/00* (2006.01)
*H04W 52/24* (2009.01)

(52) U.S. Cl.
CPC ......... *H04L 5/0048* (2013.01); *H04W 52/146* (2013.01); *H04W 52/228* (2013.01); *H04W 52/245* (2013.01)

(56) References Cited

OTHER PUBLICATIONS

Samsung, "Physical Layer Control Procedures in NTN", #GPP TSG RAN WG1 Meeting #98, R1-1908487, Prague, CZ, Aug. 26-30, 2019 (4pp.) (Year: 2019).*
International Search Report and Written Opinion, dated Nov. 30, 2020, for International Application No. PCT/US2020/047410, 19 pages.
Nokia et al., "Considerations on UL Power Control, AMC and CSI in NTN," 3GPP TSG RAN WG1 Meeting #98, R1-1908251, Prague, Czech Republic, Aug. 26-30, 2019, 6 pages.
Samsung, "Physical layer control procedures in NTN," 3GPP TSG RAN WG1 Meeting #98, R1-1908487, Prague, Czech Republic, Aug. 26-30, 2019, 4 pages.

* cited by examiner

NTN UPLINK POWER CONTROL

BACKGROUND

Technical Field

The present disclosure relates to communication systems and, more particularly, to communication systems between end user devices and non-terrestrial systems.

Description of the Related Art

In terrestrial networks, the one-way transmission delay is short (on the order of milliseconds) and characteristics of the signal typically do not change significantly during transmission. As a result, a ground-based station (e.g., cell phone tower) can provide indications to ground-based terminals (e.g., cell phones) regarding a power level of the signal transmitted by the ground-based terminal. Moreover, the indications provided by the ground-based station may indicate how much the ground-based terminal should adjust transmission power to facilitate efficient power consumption by the ground-based terminal in connection with signal transmissions.

In non-terrestrial networks (NTNs), transmission delay is more significant and characteristics of the signal transmitted by a non-terrestrial network station (e.g., satellite), may change during a transmission period. For instance, a signal transmitted by a satellite in geostationary orbit may have an associated transmission delay of 250 milliseconds or greater. This delay is significant enough that indications provided by the NTN station regarding power level of signals transmitted by the ground-based terminal may be inaccurate or invalid. These inaccurate or invalid indications may cause the ground-based terminal to operate inefficiently by transmitting signals at power levels below or exceeding an optimal level. Therefore, efficient and accurate control of transmission power by ground-based terminals of signals to NTN stations is a difficult challenge in non-terrestrial networks.

BRIEF SUMMARY

Briefly stated, the present disclosure includes embodiments directed to communications in a non-terrestrial network that includes a non-terrestrial network (NTN) station (e.g., satellite), user equipment (e.g., mobile device), and a terrestrial base station. The user equipment adjusts its uplink transmission power based on estimated and measured downlink losses over a period of time. At a first time, the NTN station transmits a reference signal having a defined transmission power. The user equipment receives and evaluates the reference signal to determine a first downlink loss of the reference signal by at least calculating a difference between a measured power level of the received reference signal and the defined transmission power. At a second time, the NTN station transmits a communication signal, which is received by the user equipment. The user equipment estimates a second downlink loss of the communication signal based on the first downlink loss and a power level of the communication signal. The user equipment estimates a first uplink loss based on the second downlink loss and a transmission power of the user equipment is adjusted based on the first uplink loss.

In some embodiments, the first uplink loss may be determined based on a third downlink loss. A second communication signal may be transmitted by the NTN station subsequent to the communication signal. The third downlink loss may be determined for the second signal based on the second downlink loss and a power level of the second signal, and the third downlink loss may be used in connection with estimating the first uplink loss.

In some embodiments, the transmission power of the user equipment may be determined based on various factors. The second downlink loss of the first signal may be estimated using an exponential filter that involves the first downlink loss, the measured power level, and a filter time constant as a weight. The first uplink loss may be estimated based on various factors that include the second downlink loss, a downlink frequency of the first signal, and an uplink frequency of a signal to be transmitted by the user equipment. The transmission power may then be determined based on the first uplink loss, the defined transmission power, and a defined uplink loss.

Additional processes may be performed to adjust or determine parameters of the user equipment, such as a second uplink loss or transmission power of the user equipment. Ephemeris information of the NTN station may be obtained and used to determine a distance between the non-terrestrial user equipment and the NTN station. A second uplink loss may then be estimated based on the distance determined and an uplink frequency of a signal to be transmitted by the user equipment to the NTN station. The transmission power of the user equipment may be determined based on a correction factor corresponding to differences between first and second uplink losses. According to the features disclosed herein, parameters for transmission of communications may be appropriately adjusted to account for differences that may affect the success or quality of signal transmission by the user equipment. However, the benefits of the present disclosure are not so limited and those skilled in the art may appreciate that other benefits not specifically discussed herein may accrue as a result of the technology disclosed herein.

DETAILED DESCRIPTION

Technologies disclosed herein are directed toward transmission power control in non-terrestrial networks that involve ground-based user equipment and non-terrestrial stations, such as satellites. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, have not been shown or described in order to avoid unnecessarily obscuring descriptions of the embodiments.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Figure 1:
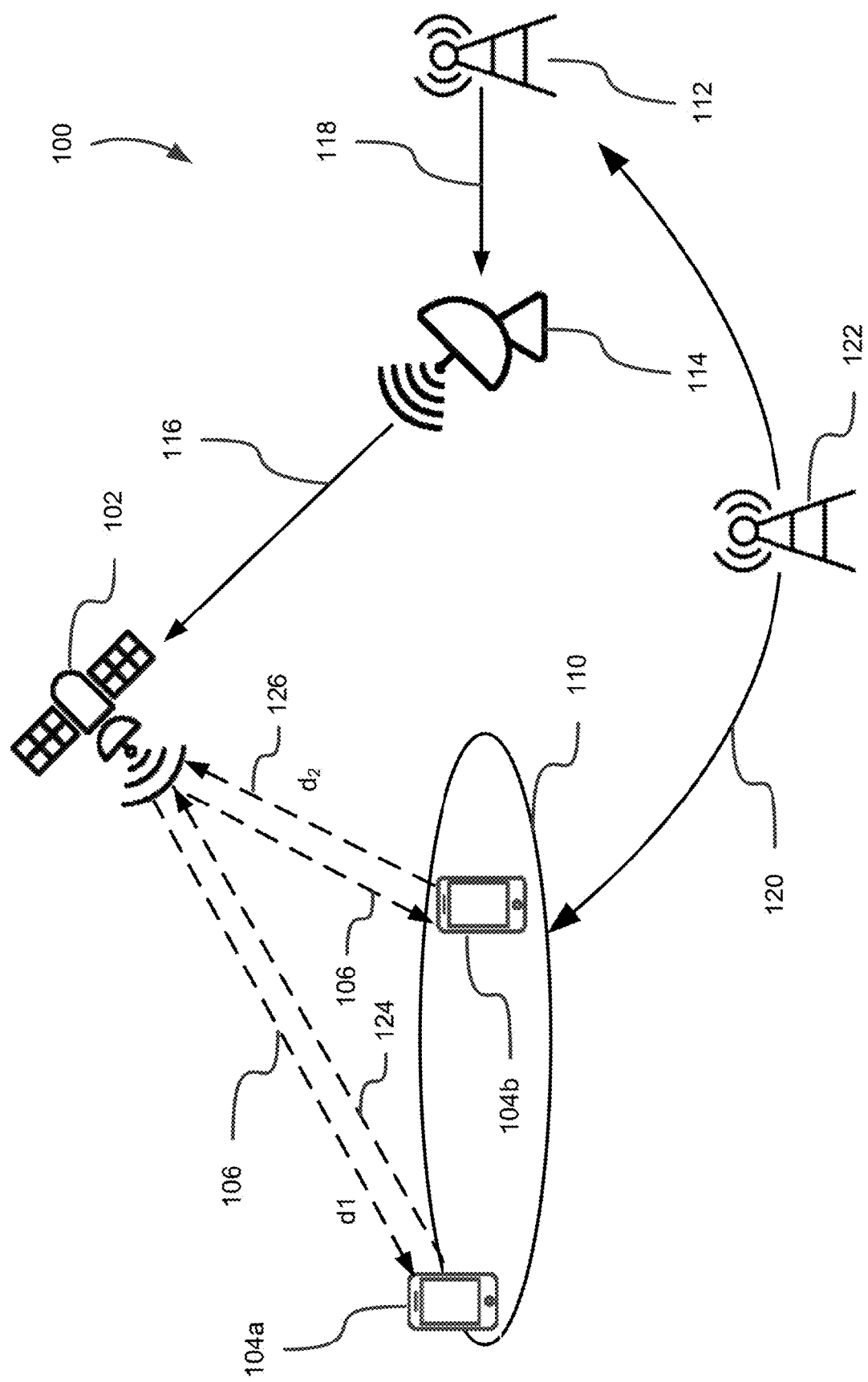
FIG. 1 is a diagram of a non-terrestrial network environment in which a non-terrestrial network station communicates with user equipment.

FIG. 1 shows a non-terrestrial network (NTN) environment 100 in which a non-terrestrial network station (NTN station) 102 communicates with a user equipment (UE) 104a and UE 104b according to one or more embodiments. Description of the UEs 104a and 104b herein is generally referred to as a UE 104. The NTN station 102 is a satellite, orbiter, or space-based station that orbits the earth or other astronomical object (e.g., planet, moon) in space. The NTN station 102 may be in geostationary orbit (~35,000 km), middle earth orbit (7000-25000 km), low earth orbit (300-1500 km), high elliptical orbit (400-50,000 km), or other orbital pattern.

The UEs 104 are each processor-based devices located on the surface of the earth and that are each configured to wirelessly receive communications from the NTN station 102. For instance, the UEs 104 may include a communication receiver that is configured to receive and process communications comprising electromagnetic waves emitted by the NTN station 102. The UE 104 may be a satellite phone, a computer system, or mobile device (e.g., cellular phone, tablet computer, internet-of-things device) that is specifically-configured to receive and process communications from the NTN station 102. The UE 104 may include a satellite communication receiver, one or more processors, one or more antennae, and memory storing instructions that, as a result of execution by the one or more processors, cause the UE 104 to perform operations described herein.

In operation, the NTN station 102 sends a communication signal 106 to the UE 104a and a communication signal 108 to the UE 104b during a transmission period. The NTN station 102 transmits the communication signals 106 and 108 according to certain parameters that affect transmission power $P_T$, fundamental frequency $f_0$, spectrum, modulation, and channel coding, by way of non-limiting example. The communication signals 106 and 108 may be referred to herein as downlink signals.

A terrestrial base station 112 located on the ground may control aspects of communication signal transmission by the NTN station 102. In particular, the base station 112 comprises or has associated therewith a computer system that includes one or more processors and memory storing a set of instructions that, as a result of execution by the one or more processors, cause the base station 112 to perform the operations described herein. Some of the one or more processors and at some of the memory may collectively form a controller that controls content and transmission characteristics (e.g., modulation and channel coding parameters, transmission power, frequency) of communications transmitted within the NTN environment 100.

The NTN environment 100 may include a terrestrial backhaul or satellite gateway 114 that serves as an intermediate link between the NTN station 102 and the base station 112. In particular, the satellite gateway 114 transmits communication signals 116 to the NTN station 102 indicating content and/or characteristics of the communication signals 106 and 108 to be sent by the NTN station 102 to the UEs 104a and 104b. The base station 112 may transmit or cause to be transmitted communication signals 118 to the satellite gateway 114 that cause the satellite gateway 114 to transmit corresponding communication signals 116 to the NTN station 102. The communication signals 118 may be sent wirelessly and/or by wired connection to the satellite gateway 114, and the communication signals 116 may be sent wirelessly (e.g., via radio frequency communications, via optical signals) to the NTN station 102. The satellite gateway 114 may include a transmitter and antenna components (e.g., parabolic antenna) configured to wirelessly transmit the communication signals 114 to the NTN station 102.

The NTN station 102 transmits the communication signals 106 and 108 to the UEs 104a and 104b based on the communication signals 116 received from the satellite gateway 114. Specifically, the NTN station 102 may transmit communication signals 106 and 108 according to signal transmission parameters specified or referenced in the communication signals 116. The UEs 104a and 104b may analyze characteristics (e.g., signal strength, frequency) of the communication signals 106 received from the NTN station 102 and, as a result of the analysis, transmit communications that affect how the NTN station 102 is to transmit future communications by the NTN station 102 to the UE 104. For instance, based on results of the analysis of the communication signals 106 and 108 by the UEs 104, the UEs 104 may transmit communication signal 120 representative of characteristics of the communication signals 106 received from the NTN station 102. In some embodiments, the communication signal 120 may be received by one or more intermediate stations 122, which propagate the communication signal 120 to reach the base station 112. The base station 112, may cause the NTN station 102 to transmit further communication signals 106 and/or 108 having transmission characteristics, such as power, modulation, and/or channel coding, based on information in the communication signals 120 provided by the UEs 104. The intermediate stations 122 may be ground-based transmitters that transmit or repeat the communication signals 116 received thereby. In some instances, the UEs 104a and 104b may communicate with the base station 112 via communications with the NTN station 102 and the satellite gateway 114—for instance, when a UE is out-of-range of the base station 112 and the intermediate station 122.

The UE 104a is located at a first location in a transmission area 110 of the NTN station 102 and the UE 104b is located at a second location in the transmission area 110. The first location of the UE 104a may be at a distance $d_1$ separating the UE 104a and the NTN station 102, and the second location of the UE 104b may be at a distance $d_2$ separating the UE 104b and the NTN station 102 that is shorter than the distance $d_1$. The quality of the communication signals 106 and 108 that are respectively received by the UEs 104a and 104b may be affected by various factors. For instance, a significant component of attenuation in strength of the signals 106 and 108 is free space path loss (FSPL), which is a function of the distance between the source and receiver, and the frequency of the transmitted signals. Free space path loss may be defined by the following Equation 1:

$$FSPL(dB) = 20\log_{10}(d) + 20\log_{10}(f) + 20\log_{10}\left(\frac{4\pi}{c}\right) \quad [1]$$

wherein d is the distance between the UE 104 and the NTN station 102 that the signal transmitted travels, f is the frequency of the signal transmitted, and c is the speed of light in a vacuum. As can be seen, the FSPL is a function of the distance d a signal travels and the frequency f of a signal.

The UEs 104a and 104b may respectively transmit communication signals 124 and 126 to the NTN station 102. A significant challenge in non-terrestrial networks is that it is a challenging and complex problem to appropriately adjust parameters for transmitting the communications 124 and 126 to the NTN station 102 by the UEs 104a and 104b to account for differences that may affect success or quality of signal transmission by the UEs 104. For instance, it is difficult to for the UEs 104 to ascertain a transmission power level in situations where the UEs 104 do not receive feedback from the NTN station 102 regarding whether the transmission power is appropriate. However, the technologies disclosed herein facilitate control of transmission power for communications between the NTN station 102 and the UE 104 to account for such differences.

Figure 2:
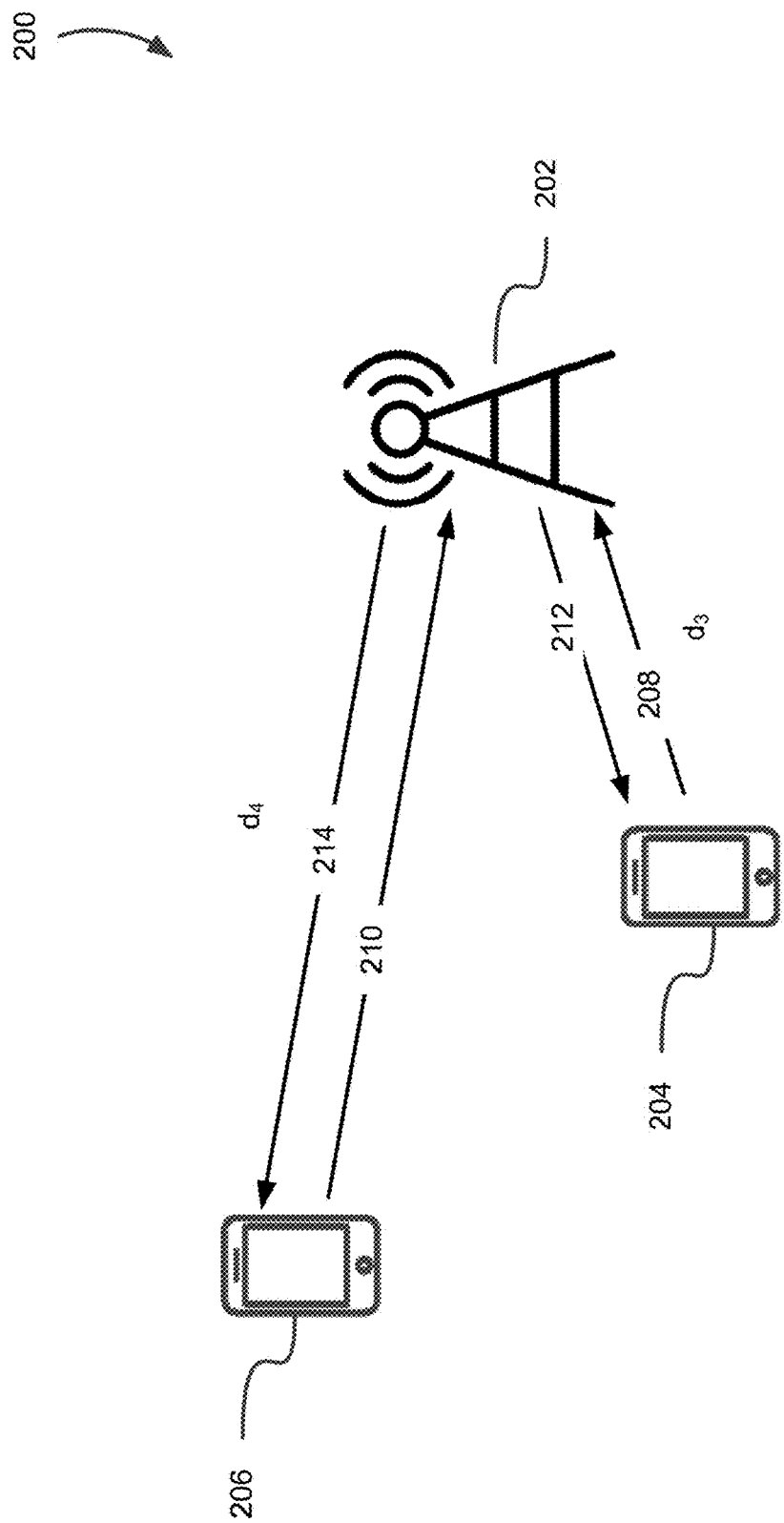
FIG. 2 is a diagram of a wireless network environment in which a terrestrial base station wirelessly communicates with user equipment.

FIG. 2 shows a terrestrial wireless network environment 200 in which a terrestrial base station 202 wirelessly communicates with a UE 204 and a UE 206 according to one or more embodiments. The terrestrial base station 202 is a ground-based system that includes a wireless transmitter, a wireless receiver, and a processor or controller configured to wirelessly communicate with the UE 204 and the UE 206. The UEs 204 and 206 are processor-based devices (e.g., mobile terminal) configured to wirelessly communicate over terrestrial wide area networks, such as cellular data networks.

As shown in FIG. 2, the UE 204 is separated from the base station 202 by a distance d3 that is shorter than a distance d4 between the UE 206 and the base station 202. A significant issue in the network environment 200 is that, as a result of the differences in distances d3 and d4, a signal 208 transmitted by the UE 204 to the base station 202 will experience less attenuation in comparison to a signal 210 transmitted by the UE 206 to the base station 202. The UEs 204 and 206 may adjust their respective transmission powers of signals 208 and 210 to the base station 202 such that the signals 208 and 210 have substantially similar levels of signal strength when received by the base station 202. For instance, in response to receiving the signals 208 and 210, the base station 202 may send power control commands 212 and 214 respectively to the UEs 204 and 206 specifying signal transmission settings according to which the UEs 204 and 206 should transmit future signals to the base station 202. In this way, the base station 202 may remotely adjust the transmission power of the UEs 204 and 206 to facilitate efficient power consumption and reduced interference and/or noise in connection with additional signal transmissions. However, because the difference between distances $d_1$ and $d_2$ is much greater than the difference between the distances $d_3$ and $d_4$, appropriately adjusting the transmission powers by the UEs 104a and 104b of the NTN environment 100 can be a significantly more difficult challenge than adjusting transmission powers by the UEs 204 and 206.

Figure 3:
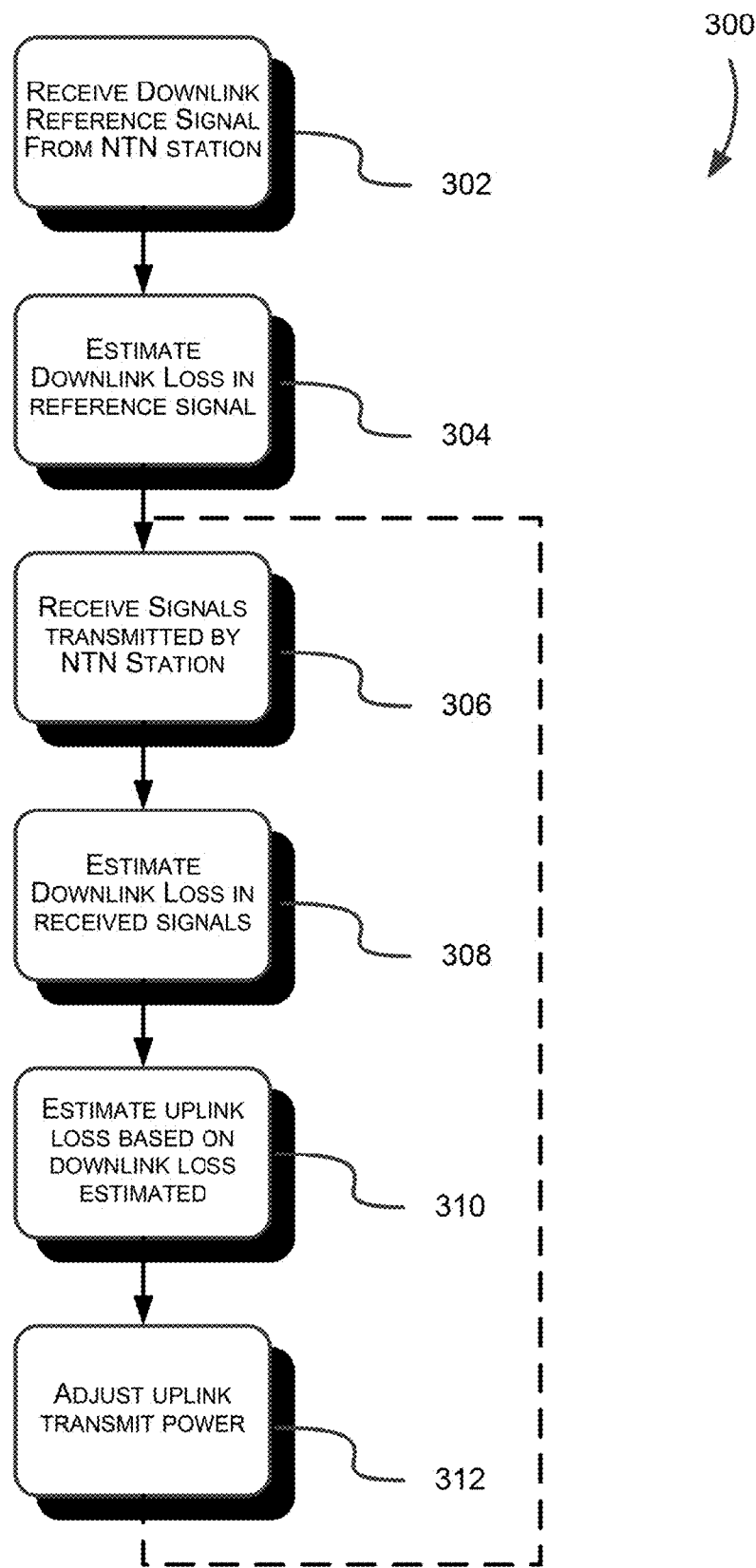
FIG. 3 is a method of transmission power control in the non-terrestrial network environment of FIG. 1 according to one or more embodiments.

FIG. 3 shows a method 300 of adjusting a power level for transmitting signals by the UEs 104 to the NTN station 102 according to one or more embodiments. The method 300 is performed by the UEs 104 without receiving feedback from the NTN station 102 regarding sufficiency of signal transmission power levels of signals transmitted by the UE 104 to the NTN station 102. The method 300 begins by receiving 302, at a first time $t_1$, a downlink reference signal $S_{ref}$ from the NTN station 102. The NTN station 102 may transmit the downlink reference signal received in 302 at a defined transmission power $P_0$ that is known by the UEs 104. The UEs 104 may identify the reference signal $S_{ref}$ according to content or characteristics of the reference signal $S_{ref}$. For instance, the reference signal $S_{ref}$ may include, as content, a defined bit sequence that the UEs 104 recognize as identifying a signal received in 302 as the reference signal $S_{ref}$ or may include a particular portion (e.g., header, footer) that identify the signal received as a reference signal $S_{ref}$. As another example, the NTN station 102 may transmit the reference signal $S_{ref}$ to the UEs 104 periodically in a predetermined frame among a plurality of data frames.

Thereafter, the method 300 includes estimating 304 downlink loss or attenuation $DL_{loss}$ in the reference signal $S_{ref}$ received in 302. In particular, the UE 104 may measure a power level $P_1$ of the downlink reference signal $S_{ref}$ received in 302, e.g., in decibels. The UE 104 may then determine, as the reference signal downlink loss $DL_{ref\_loss}$, a difference between the defined transmission power $P_0$ and the measured power level $P_1$.

The method 300 then includes estimating the uplink loss or attenuation $UL_{loss}$ based on estimates of downlink loss $DL_{loss}$ of one or more additional signals received by the UE 104 from the NTN station 102. For instance, the method 300 includes receiving 306, by the UE 104 at a second time $t_2$, a signal $S_2$ transmitted by the NTN station 102. In connection with receiving 306, the UE 104 also determines a power level $P_2$ of the signal received in 306. In some implementations, the UE 104 may receive 306 a plurality of signals $S_2$, $S_3$, $S_4$, . . . , $S_N$ respectively at a plurality of times $t_2$, $t_3$, $t_4$, . . . , $t_N$. Then, the method 300 includes estimating 308 downlink loss or attenuation in the signals received in 306. For instance, the method 300 may include estimating path loss for each signals as $PL(S_2)$, $PL(S)$, $PL(S_4)$, . . . , $PL(S_N)$. The UE 104 may store in memory measured signal strength levels and estimated path loss PL in association with time information corresponding to each signal.

In some embodiments, for the signals received in 306, the method 300 includes using a low pass filter (LPF) with an appropriate filter time constant T to process the signals received. As one example, estimating 308 the downlink loss of the signals received includes applying an exponential filter with the filter time constant T as a weight. Specifically, the exponential filter used in estimating 308 may be defined according to the following Equation 2:

$$DL_{Loss}(t) = \left(\frac{P(t)}{T}\right) + \left(\frac{T-1}{T}\right)DL_{Loss}(t_{prev}) \quad [2]$$

wherein t is a current or future time, P(t) is the measured power of the signal(s) received in 306, T is the filter time constant, and $t_{prev}$ is a time previous to the time t. For the signal $S_2$ received at the time $t_2$, the $DL_{loss}(t)$ may be determined as the power level of the signal $S_2$ measured by the UE 104, the filter time constant T may be two (2), and the $DL_{loss}(t_{prev})$ is the reference signal downlink loss $DL_{ref\_loss}$.

The UE 104 may estimate in 308 downlink loss for more than one signal. Subsequent to estimating the downlink loss for the second signal $S_2$, the UE 104 may estimate a downlink loss for a third signal $S_3$ received at a time $t_3$ after the time $t_2$ using Equation 2. In such an instance, P(t) is the measured power level P(t) of the third signal $S_3$ and the $DL_{loss}(t_{prev})$ is the estimated downlink loss for the second signal $S_2$. In this way, the UE 104 may successively estimate the downlink loss $DL_{Loss}$ for each signal received in 306. Each $DL_{Loss}(t)$ estimated may be stored in the memory of the UE 104 for calculating a future or next $DL_{Loss}$ value.

Thereafter, the method 300 includes estimating 310 an uplink loss $UL_{Loss}(t)$ for signals transmitted from the UE 104 to the NTN station 102 based on the downlink transmission power value estimated in 308. The uplink loss $UL_{Loss}(t)$ may be calculated according to the following Equation 3:

$$UL_{Loss}(t) = DL_{Loss}(t) + \alpha * \log\left(\frac{f_{UL}}{f_{DL}}\right) \quad [3]$$

wherein $DL_{Loss}(t)$ is the downlink loss calculated in Equation 2, $f_{UL}$ is the frequency of the uplink signal to be transmitted by the UE 104, $f_{DL}$ is the frequency of the downlink signal transmitted by the NTN station 102 and received in 306, and $\alpha$ is a constant. The frequency $f_{DL}$ may be known to the UE 104 or may be measured by the UE 104.

Thereafter, the UE 104 may adjust 312 an uplink transmit power $P_T$ for transmitting signals to the NTN station 102. In particular, the UE 104 calculates the uplink transmit power $P_T$ according to Equation 4 as follows:

$$P_T(t) = \frac{P_0 UL_{Loss}(t)}{PL_0} \quad [4]$$

wherein $P_0$ is the defined transmission power of the reference signal $S_{ref}$, $UL_{Loss}(t)$ is the uplink loss calculated using Equation 3, and $PL_0$ is a known path loss of a signal, such as the reference signal $S_{ref}$. The path loss $PL_0$ may be a known uplink path loss or may be calculated as $(P_0 - P_{meas})$, wherein $P_{meas}$ is the signal strength measured by the UE 104 of the reference signal $S_{ref}$ received in 302. In some embodiments, the path loss $PL_0$ and/or the defined transmission power $P_0$ may be transmitted to the UE 104 as part of system parameters in a system information block.

As a result of calculating the uplink transmit power $P_T$, the UE 104 may adjust the power settings of its transmitter such that signals transmitted by the UE 104 to the NTN station 102 will be transmitted at the transmission power $P_T$.

The operations 306 through 312 may be repeated as additional signals are received. For each iteration of the operations 306 through 312 a single signal received in 306 may be processed or a plurality of signals may be received in 306 and be processed. The method 300 may be performed in connection with receiving a reference signal $S_{ref}$, may be periodically performed by the UE 104, or may be performed as a result of occurrence of a defined event or satisfaction of a defined criterion, such as the UE 104 consuming an amount of power exceeding a defined threshold in connection with signal transmissions to the NTN station 102.

Figure 4:
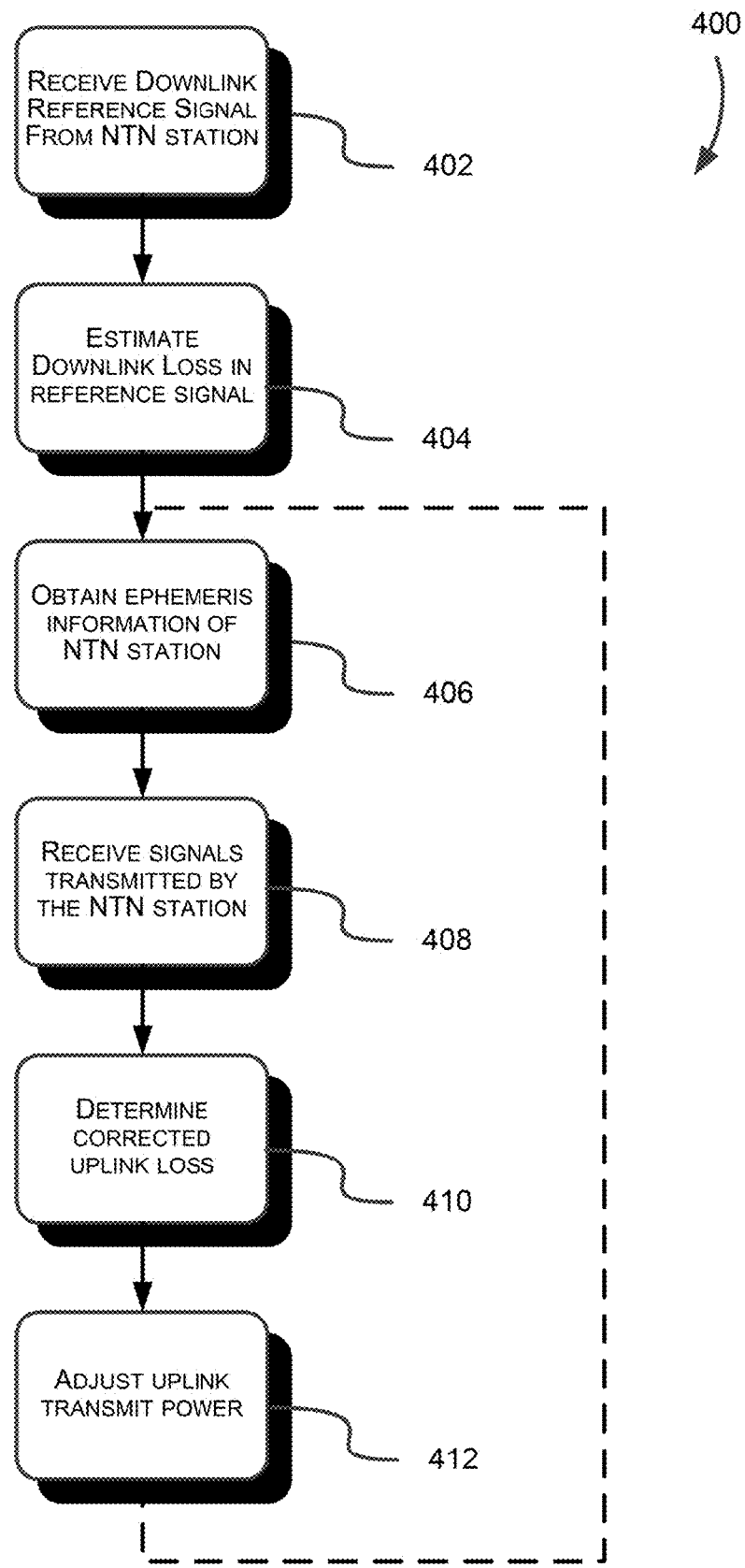
FIG. 4 is a method of transmission power control in the non-terrestrial network environment of FIG. 1 according to one or more embodiments.

FIG. 4 shows a method 400 of adjusting a power level for transmitting signals by the UEs 104 to the NTN station 102 according to one or more embodiments. The method 300 is performed by the UEs 104 without receiving feedback from the NTN station 102 regarding sufficiency of signal transmission power levels of signals transmitted by the UE 104 to the NTN station 102. The method 400 begins by receiving 402, at a first time $t_1$, a downlink reference signal $S_{ref}$ from the NTN station 102 and estimating 404 downlink loss or attenuation $DL_{loss}$ in the reference signal $S_{ref}$ received in 402, as described herein with respect to the method 300.

The method 400 includes obtaining 406 ephemeris information regarding the NTN station 102. The ephemeris information is indicative of a position of the NTN station 102 in space relative to the earth (or astronomical object it orbits). The ephemeris information obtained may include one or more information selected from orbit inclination, orbit eccentricity, semi-major axis, true anomaly, right ascension of the ascending node, and/or argument of perigee. The UE 104 may use the ephemeris information to determine a position of the NTN station 102. In some embodiments, the UE 104 may obtain other ephemeris information from one or more NTN stations other than the NTN station 102, and use the other ephemeris information to determine a location of the UE 104.

The method 400 also includes receiving 408, by the UE 104 at a second time $t_2$, a signal $S_2$ transmitted by the NTN station 102. In connection with receiving 408, the UE 104 may also determine a power level $P_2$ of the signal received in 408. In some implementations, the UE 104 may receive at 408 a plurality of signals $S_2, S_3, S_4, \ldots, S_N$ respectively at a plurality of times $t_2, t_3, t_4, \ldots, t_N$. The ephemeris information may be obtained 406 by the UE 104 as part of or in connection with the signals received in 408—for example, the NTN station 102 may provide ephemeris information with each of the signals in 408.

Figure 5:
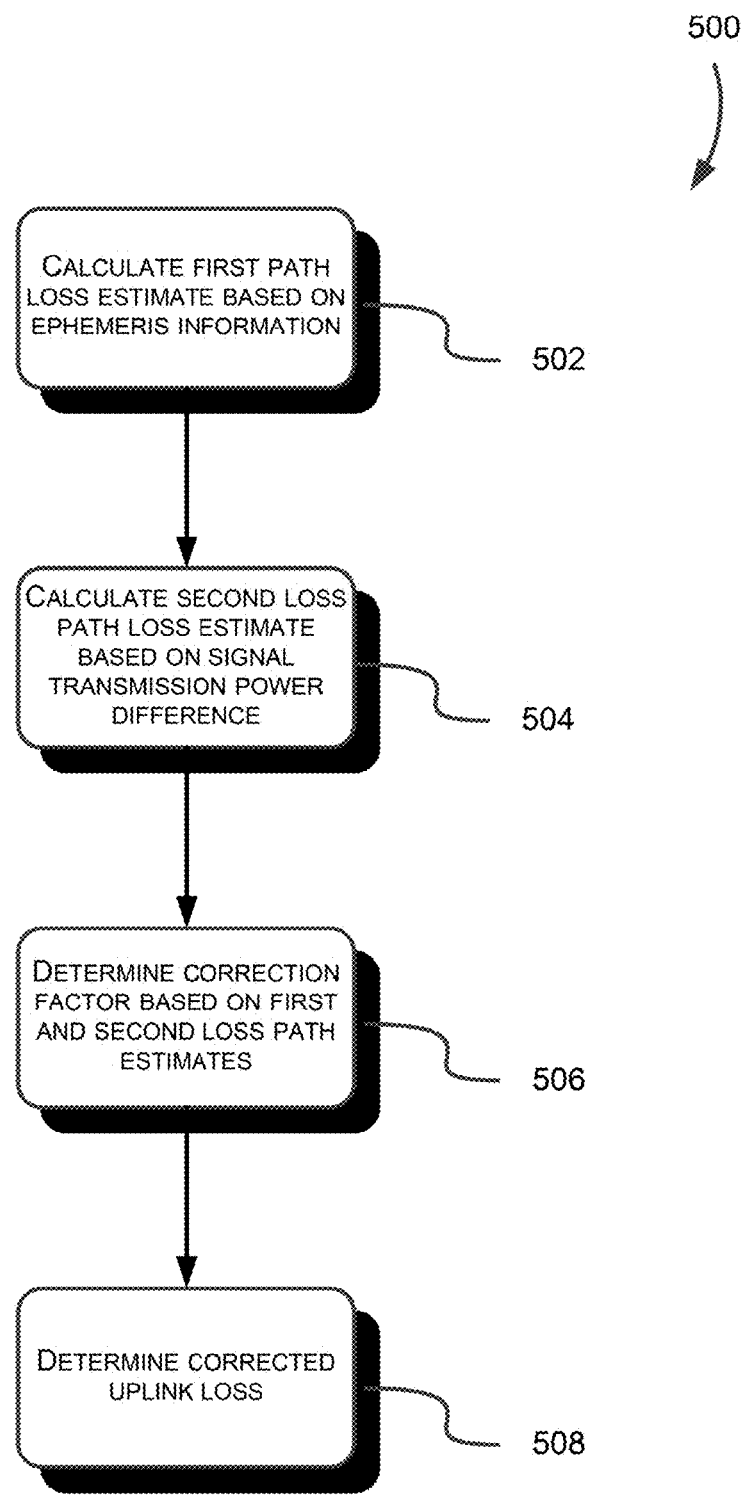
FIG. 5 is a method of determining a corrected uplink loss in the non-terrestrial network environment of FIG. 1 according to one or more embodiments.

Thereafter, the method 400 includes determining 410 a corrected uplink loss $UL_{corr}$ based on the ephemeris information and the estimated downlink loss $DL_{Loss}$ in the reference signal $S_{ref}$. FIG. 5 shows a method 500 of determining a corrected uplink loss $UL_{corr}$ according to one or more embodiments. The method 500 is performed by the UE 104 in connection with 410 of the method 400. The method 500 includes calculating 502 a first path loss estimate $LE_1$ based on the ephemeris information of the NTN station 102 obtained in 406. For instance, the UE 104 may determine the distanced between the NTN station 102 and the UE 104 based on the ephemeris information. The UE 104 may then calculate the first path loss estimate LE1 using the distance d and a frequency $f_{DL}$ known to the UE 104. Using the Friis Transmission Formula, the first path loss estimate $LE_1$ may be calculated according to Equation 5:

$$LE_1 = 20\log_{10}\left(\frac{4\pi d}{\lambda_{UL}}\right) \quad [5]$$

wherein d is the distance between the UE 104 and the NTN station 102, and $\lambda_{UL}$ is the wavelength of an uplink signal transmitted by the UE 104 to the NTN station 102. It is noted that Equation 5 is similar to Equation 1, but Equation 5 produces results on a linear scale whereas Equation 5 produces results on a logarithmic scale (i.e., in decibels). Calculating 502 the first path loss estimate $LE_1$ may include calculating a plurality of first path loss estimates $LE_1(t_2)$, $LE_1(t_3)$, $LE_1(t_4)$, ..., $LE_1(t_N)$ for a plurality of times $t_2$, $t_3$, $t_4$, ..., $t_N$ at which the corresponding signals in 406 were received.

The method 500 also includes calculating 504 second path loss estimates $LE_2$. In particular, the UE 104 measures the downlink loss of the signals received in 406 according to Equations 2 and 3 described above in 308 and 310 of the method 300. The UE 104 applies an exponential filter, as described with respect to Equation 2, to the downlink loss estimated based on the signal(s) received in 406 and, in some instances, the reference signal $S_{ref}$ received in 402. Then, the UE 104 obtains the second path loss estimate $LE_2$ using Equation 3 by substituting the downlink loss estimate obtained using Equation 2 into Equation 3. Calculating 504 second path loss estimates $LE_2$ may include calculating a plurality of second path loss estimates $LE_2(t_2)$, $LE_2(t_3)$, $LE_2(t_4)$, ..., $LE_2(t_N)$ for a plurality of times $t_2$, $t_3$, $t_4$, ..., $t_N$.

Thereafter, the method 500 includes determining a correction factor K based on the first and second path loss estimate(s) $LE_2$ calculated in 502 and 504. The correction factor K is a mathematical adjustment to be applied to the first path loss estimate(s) $LE_1$ to calculate the corrected uplink loss $UL_{Corr}$. The correction factor K may be determined by taking differences between corresponding pairs of the second path loss estimate(s) $LE_2$ and the first path loss estimate(s) $LE_1$. For instance, the correction factor may be calculated by obtaining, for each time t, a difference between the second path loss estimate(s) $LE_2$ and the first path loss estimate(s) $LE_1$ as follows:

$$K(t_2) = LE_2(t_2) - LE_1(t_2);$$

$$K(t_3) = LE_2(t_3) - LE_1(t_3);$$

$$K(t_4) = LE_2(t_4) - LE_1(t_4);$$

...

$$K(t_N) = LE_2(t_N) - LE_1(t_N);$$

Then, the correction factor K may be calculated by calculating a representative value of the correction factors $K(t_2)$, $K(t_3)$, $K(t_4)$, ... $K(t_N)$, such as an average or mean. In some embodiments, the correction factor K may be determined by calculating a mean square error between the first and second loss estimates $LE_1$ and $LE_2$ for a plurality of times $t_2$, $t_3$, $t_4$, ..., $t_N$. The correction factor K is a unit less scalar value that accounts for deviation between the estimated losses $LE_1$ and $LE_2$.

Once the correction factor K is determined in 506, the method 500 includes determining a corrected uplink loss $UL_{Corr}$. The corrected uplink loss $UL_{Corr}$ may be calculated by obtaining an uplink loss $UL_{Loss}(t)$ for a time t according to Equation 3. The corrected uplink loss $UL_{Corr}$ may then be determined according to Equation 6 as follows:

$$UL_{Corr}(t) = K * UL_{Loss}(t) \tag{6}$$

The correction factor K may be used to calculate corrected uplink losses $UL_{Corr}$ for signals that are received in the future without having to recalculate the correction factor for each new signal K.

The method 500 concludes and the UE 104 returns to the method 400. The method 400 continues at 412 by adjusting 412 the uplink transmit power $P_T(t)$ at a time t using Equation 7 as follows:

$$P_T(t) = \frac{P_0 UL_{Corr}(t)}{PL_0} \tag{7}$$

wherein $P_0$ is the defined transmission power of the reference signal $S_{ref}$, $UL_{Corr}(t)$ is the uplink loss calculated using Equation 6, and $PL_0$ is a known path loss of a signal, such as the reference signal $S_{ref}$. The path loss $PL_0$ may be a known uplink path loss or may be calculated as $(P_0 - P_{meas})$, wherein $P_{meas}$ is the signal strength measured by the UE 104 of the reference signal $S_{ref}$ received in 402. In some embodiments, the path loss $PL_0$ and/or the defined transmission power $P_0$ may be transmitted to the UE 104 as part of system parameters in a system information block.

Figure 6:
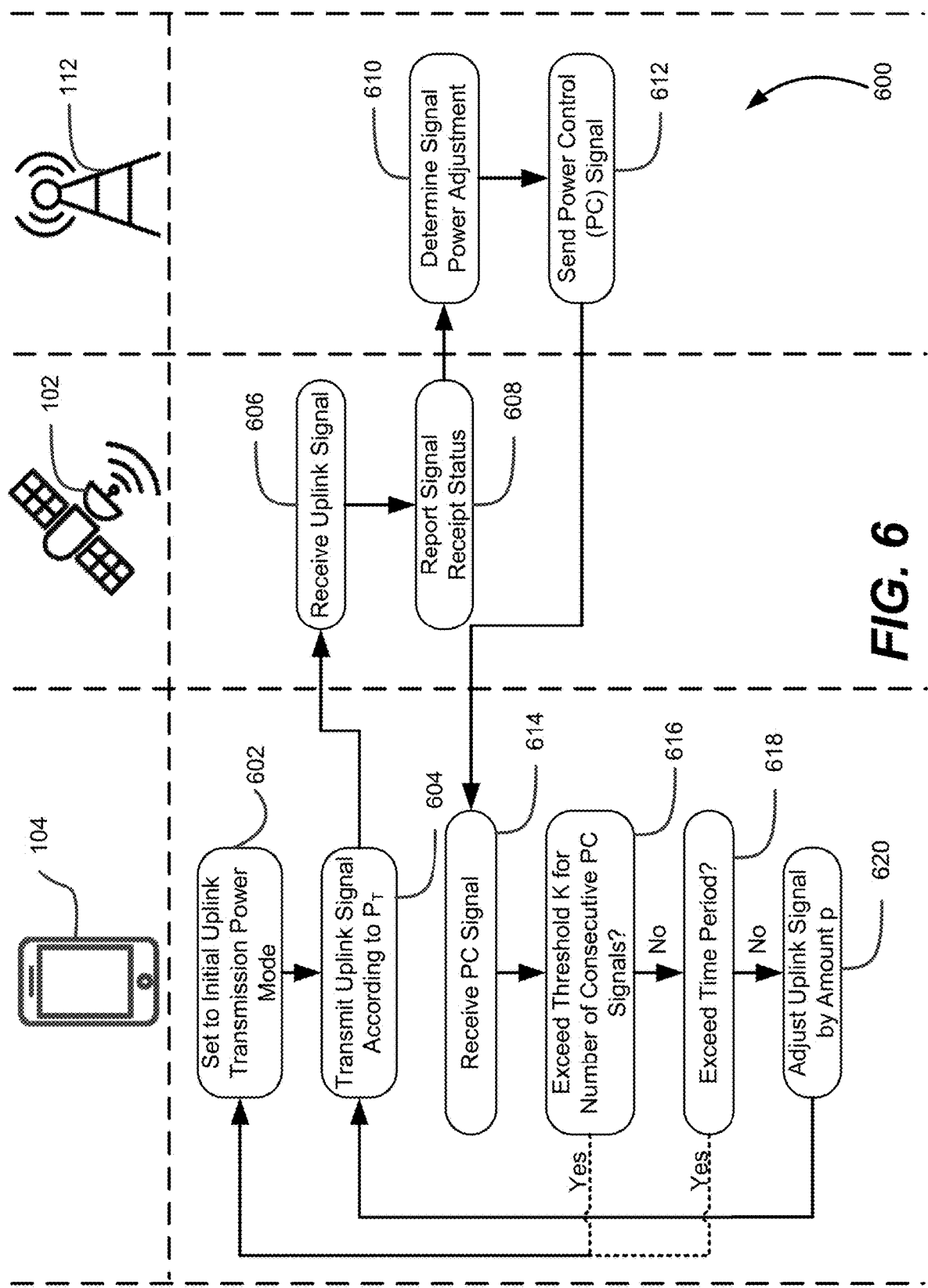
FIG. 6 is a method of transmission power control in the non-terrestrial network environment of FIG. 1 according to one or more embodiments.

FIG. 6 shows a method 600 for closed-loop uplink power control by a UE 104 in connection with communications with the NTN station 102 and the base station 112 according to one or more embodiments. In NTN systems, transmission latency that it takes for a communication transmitted by the NTN station 102 to reach the UE 104 and then for a communication transmitted by the UE 104 in response to reach the NTN station 102 is very long in comparison to terrestrial networks. For instance, the latency for a satellite in geostationary orbit in a bent-pipe communication system may be 250 milliseconds or greater. The latency for satellites in low earth orbit can still be greater than 10 milliseconds. In either event, the latency in previous systems was too long to facilitate sufficient uplink power control. By contrast, in the method 600, the UE 104 adjusts the power transmission level $P_T$ of signals transmitted to the NTN station 102 based on power control signals received from the base station 112.

The method 600 includes setting 602 the UE 104 to an initial uplink transmission power mode. In the initial uplink transmission power mode, the UE 104 operates in an open-loop control condition according to the method 300 or according to the method 400 described herein. That is, the UE 104 adjusts the uplink transmission power $P_T$ of communications sent to the NTN station 102 based on estimated uplink losses $UL_{Loss}$ of the signals 124 and 126 sent to the NTN station 102. Thereafter, the method 600 includes transmitting, by the UE 104 to the NTN station 102, uplink signals according to the transmission power $P_T$ selected.

Next, the NTN station 102 receives 606 the uplink signal transmitted by the UE 104. The NTN station 102 evaluates the uplink signal and verifies whether the uplink signal satisfies a criterion for successful receipt of signals—for example, that the uplink signal has a received power PR exceeding a power level threshold and/or that the data of the uplink signal can be successfully processed. The NTN station 102 may report 608 a status of the signal received by the NTN station 102 to the base station 112. Based on the status provided by the NTN station 102, the base station 112 may determine whether the transmission power $P_T$ of the UE 104 should be increased or decreased. The NTN station 102 determines 610 whether to send a power control signal UP that causes the UE 104 to increase the transmission power $P_T$ or a power control signal DOWN that causes the UE 104 to decrease the transmission power $P_T$. Then, the NTN station 102 sends 612 a power control signal to the UE 104 according to the determination in 610.

The UE 104 receives 614 the power control signal and determines whether to increase or decrease the transmission power $P_T$ based on the power control signal received. In particular, the UE 104 adjusts the transmission power $P_T$ by a predetermined amount p based on the power control signal received in 614. If the signal received in 614 is a power control signal DOWN, the UE 104 decreases the transmission power $P_T$ by the predetermined amount p. For instance, the transmission power is adjusted as $P_T(t_N)=P_T(t_P)-p$, wherein $P_T(t_N)$ is the new transmission power, $P_T(t_P)$ is the previous transmission power, and p is the predetermined amount of power change (e.g., in Watts). On the other hand, if the signal received in 614 is a power control signal UP, the UE 104 increases the transmission power $P_T$ by the predetermined amount p. For instance, the transmission power is adjusted as $P_T(t_N)=P_T(t_P)+p$, wherein $P_T(t_N)$ is the new transmission power, $P_T(t_P)$ is the previous transmission power, and p is the predetermined amount of power change. The predetermined power change amount p may be set in software or firmware of the UE 104.

Before the UE 104 adjusts the transmission power $P_T$, the UE 104 determines 616 whether a number of power control UP signals were consecutively received exceeding a defined threshold K, or whether a number of consecutive power control DOWN signals were consecutively received exceeding the defined threshold K. The UE 104 implements a counter in memory that tracks the number of consecutively received power control UP or DOWN signals and a bit or flag indicating the type of consecutively received power control signals. For each power control signal of a different type, the counter is reset. For instance, it the last three power control signals were power control UP signals, the counter is set to three and the type bit is set to UP (e.g., binary value of 1). Then, if a power control DOWN signal is received, the counter is set to one (1) and the bit type is set to DOWN (e.g., binary value of 0). The defined threshold K may be set by command signals received from the base station 112 or as a result of software/firmware updates provided to the UE 104.

If the number of consecutive power control signals of the same type exceeds the threshold K, the UE 104 reinitializes back to operating according to the method 300 or the method 400—for example, by receiving a downlink reference signal $S_{ref}$ from the NTN station 102 and estimating a downlink loss based thereon. If the number of consecutive power control signals does not exceed the defined threshold K in 616, the UE 104 determines whether a defined time period TP has been exceeded. Specifically, the UE 104 resets the transmission power $P_T$ after every time period TP according to the method 300 or the method 400. The UE 104 may include a software, firmware, and/or hardware based clock that is reset to zero and that begins elapsing at 602. In operation, the UE 104 periodically checks to determine whether the time period TP has elapsed since setting 602 the initial uplink transmission power mode and does not only check after a power control signal is received in 614.

At 618, the UE 104 determines whether the elapsed count of the clock exceeds the time period TP. If so, the UE 104 returns to 602 to reset the transmission power $P_T$ according to the method 300 or the method 400. If not, the UE 104 proceeds to 620 and adjusts the transmission power $P_T$ by the predetermined amount p. As described above, the UE 104 increases the transmission power $P_T$ by the amount p in response to receiving a power control UP signal at 614 and decreases the transmission power $P_T$ by the amount p in response to receiving a power control DOWN signal at 614$P_T$.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a non-terrestrial user equipment at a first time, a reference signal transmitted by a non-terrestrial network (NTN) station, the reference signal having a defined transmission power by the NTN station;
determining a first downlink loss of the reference signal by at least determining a difference between a measured power level of the received reference signal and the defined transmission power;
receiving, by the non-terrestrial user equipment at a second time, a first communications signal transmitted by the NTN station, wherein the first communications signal is not a reference signal;
estimating a second downlink loss of the first communications signal based on the first downlink loss and a power level of the first communications signal;
estimating a first uplink loss for signal transmission based on the second downlink loss; and
adjusting a transmission power of a transmitter of the non-terrestrial user equipment based on the first uplink loss.

2. The method of claim 1, wherein estimating the second downlink loss of the first signal involves application of an exponential filter having parameters that include the first downlink loss, the measured power level, and a filter time constant as a weight.

3. The method of claim 2, wherein the exponential filter is defined according to the Equation:

$$DL_{Loss}(t) = \left(\frac{P(t)}{T}\right) + \left(\frac{T-1}{T}\right)DL_{Loss}(t_{prev})$$

wherein $DL_{Loss}$ is the second downlink loss, t is a time, P(t) is the measured power of the reference signal, T is the filter time constant, and $t_{prev}$ is a time previous to the time t.

4. The method of claim 1, wherein the first uplink loss is estimated based on the second downlink loss, a downlink frequency of the first communications signal, and an uplink frequency of a signal to be transmitted by the non-terrestrial user equipment.

5. The method of claim 4, wherein the first uplink loss is defined according to the Equation:

$$UL_{Loss}(t) = DL_{Loss}(t) + \alpha * \log\left(\frac{f_{UL}}{f_{DL}}\right)$$

wherein $UL_{Loss}$ is the first uplink loss, $DL_{Loss}$ is the second downlink loss, $f_{UL}$ is the uplink frequency, t is a time, $f_{DL}$ is the downlink frequency, and $\alpha$ is a constant.

6. The method of claim 1, wherein the transmission power is determined based on the first uplink loss, the defined transmission power, and a defined uplink loss.

7. The method of claim 1, wherein the method comprises:
receiving, by the non-terrestrial user equipment at a second time, a second communications signal transmitted by the NTN station; and
determining a third downlink loss of the second communications signal based on the second downlink loss and a power level of the second communications signal, wherein the first uplink loss is estimated based on the third downlink loss.

8. The method of claim 1, comprising:
obtaining ephemeris information of the NTN station;
determining a distance between the non-terrestrial user equipment and the NTN station based on the ephemeris information; and
estimating a second uplink loss based on the distance and an uplink frequency of a signal to be transmitted by the non-terrestrial user equipment to the NTN station.

9. The method of claim 8, comprising:
determining a correction factor based on differences between the first uplink loss and the second uplink loss; and
determining the transmission power using the correction factor.

10. A terminal for communicating with a non-terrestrial network (NTN) station, comprising:
a receiver configured to receive signals from the NTN station;
a transmitter configured to transmit signals to the NTN station;
one or more processors; and
memory storing a set of instructions that, as a result of execution by the one or more processors, cause the terminal to:
receive, by the receiver at a first time, a reference signal transmitted by the NTN station, the reference signal having a defined transmission power by the NTN station;
determine a first downlink loss of the reference signal by at least determining a difference between a measured power level of the received reference signal and the defined transmission power;
receive, by the receiver at a second time, a first communications signal transmitted by the NTN station, wherein the first communications signal is not a reference signal;
estimate a second downlink loss of the first communications signal based on the first downlink loss and a power level of the first communications signal;
estimate an uplink loss for signal transmission based on the second downlink loss; and
transmit, from the transmitter to the NTN station, a signal using a transmission power determined based on the first uplink loss.

11. The terminal of claim 10, wherein execution of the set of instructions causes the terminal to:
estimate the second downlink loss of the first communications signal using an exponential filter that includes the first downlink loss, the measured power level, and a filter time constant as a weight of the exponential filter; and
estimate the first uplink loss based on the second downlink loss, a downlink frequency of the first communications signal, and an uplink frequency of a signal to be transmitted by the terminal.

12. The terminal of claim 10, wherein execution of the set of instructions causes the terminal to:
obtain ephemeris information of the NTN station;
determine a distance between the terminal and the NTN station based on the ephemeris information; and
estimate a second uplink loss based on the distance and an uplink frequency of a signal to be transmitted to the NTN station by the terminal, the transmission power determined based on the second uplink loss.

13. The terminal of claim 10, wherein execution of the set of instructions causes the terminal to:
receive, by the receiver at a second time, a second communications signal transmitted by the NTN station; and
determine a third downlink loss of the second communications signal based on the second downlink loss and a power level of the second communications signal, wherein the first uplink loss is estimated based on the third downlink loss.

14. A method, comprising:
estimating a first downlink loss estimate based on a power level of a reference signal and a second downlink loss estimate based on the first downlink loss estimate and a power level of a first communications signal, wherein the first communications signal is not a reference signal;
setting a transmission power of a transmitter of non-terrestrial user equipment to a first level based on the first downlink loss estimate and the second downlink loss estimate;
transmitting a second communications signal from the transmitter to a non-terrestrial network (NTN) station using the transmission power, wherein the second communications signal is not a reference signal;
receiving, in response to transmitting the second communications signal, a first power control signal from a terrestrial base station directing the non-terrestrial user equipment to change the transmission power in a first direction; and
adjusting the transmission power-of the transmitter by a predetermined amount in the first direction in response to the first power control signal.

15. The method of claim 14, comprising:
receiving a second power control signal from the terrestrial base station directing the non-terrestrial user equipment to change the transmission power in a second direction opposite to the first direction; and
adjusting the transmission power-of the transmitter by the predetermined amount in the second direction in response to the second power control signal.

16. The method of claim 15, wherein the first direction represents an increase in the transmission power, and the second direction represents a decrease in the transmission power.

17. The method of claim 14, wherein the predetermined amount is specified in memory of the non-terrestrial user equipment.

18. The method of claim 14, comprising:
consecutively receiving a plurality of first power control signals from the terrestrial base station;
determining that a number of the plurality of first power control signals exceeds a defined threshold; and
resetting, as a result of determining that the number exceeds to defined threshold, the transmission power based on a third downlink loss estimate and a fourth downlink loss estimate.

19. The method of claim 14, wherein the transmission power is set at a first time, the method comprising:
determining whether a defined time period has elapsed since the first time; and
resetting, as a result of determining that the power has elapsed, the transmission power based on a third downlink loss estimate and a fourth downlink loss estimate.

20. The method of claim 14, wherein setting the transmission power includes:
obtaining ephemeris information of the NTN station;
determining a distance between the non-terrestrial user equipment and the NTN station based on the ephemeris information;
estimating a second uplink loss based on the distance and an uplink frequency of a signal to be transmitted by the non-terrestrial user equipment to the NTN station;
determining a correction factor based on differences between the first uplink loss and the second uplink loss; and
determining the transmission power using the correction factor.

* * * * *